United States Patent
Fukunaga et al.

(10) Patent No.: US 8,159,997 B2
(45) Date of Patent: Apr. 17, 2012

(54) WIRELESS COMMUNICATION SYSTEM, WIRELESS BASE STATION, USER EQUIPMENT, AND MULTI SERVICE MANAGEMENT EQUIPMENT

(75) Inventors: Yoshiaki Fukunaga, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 497 days.

(21) Appl. No.: 12/407,296

(22) Filed: Mar. 19, 2009

(65) Prior Publication Data

US 2009/0245155 A1  Oct. 1, 2009

(30) Foreign Application Priority Data

Mar. 28, 2008 (JP) ................. 2008-088393

(51) Int. Cl.
*H04W 4/00* (2009.01)
*H04L 12/26* (2006.01)

(52) U.S. Cl. ..................... 370/321; 370/341
(58) Field of Classification Search .............. None
See application file for complete search history.

(56) References Cited

U.S. PATENT DOCUMENTS

| | | | |
|---|---|---|---|
| 2003/0119452 A1 | 6/2003 | Kim et al. | |
| 2004/0121788 A1* | 6/2004 | Moon et al. | 455/502 |
| 2005/0042987 A1* | 2/2005 | Lee et al. | 455/67.11 |
| 2005/0063339 A1 | 3/2005 | Jeong et al. | |
| 2005/0185620 A1 | 8/2005 | Lee et al. | |
| 2007/0115813 A1* | 5/2007 | Hyon et al. | 370/229 |
| 2007/0165551 A1* | 7/2007 | Proctor et al. | 370/312 |
| 2007/0259681 A1* | 11/2007 | Cheng et al. | 455/522 |
| 2008/0056255 A1* | 3/2008 | Birman et al. | 370/390 |
| 2008/0065945 A1* | 3/2008 | Curcio et al. | 714/748 |
| 2009/0303997 A1* | 12/2009 | Zijst | 370/390 |

FOREIGN PATENT DOCUMENTS

| | | |
|---|---|---|
| JP | 2006-304067 | 11/2006 |
| JP | 2006-528455 | 12/2006 |
| JP | 2007-518307 | 7/2007 |
| JP | 2007-300503 | 11/2007 |
| WO | 2004/102878 | 11/2004 |
| WO | 2005/018267 | 2/2005 |

OTHER PUBLICATIONS

Extended European Search Report with Annex, issued for corresponding European Patent Application No. 09156207.4 mailed Jun. 16, 2011.
3GPP TS36.300 V8.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); Sep. 2007.

* cited by examiner

*Primary Examiner* — Chi H Pham
*Assistant Examiner* — Soon-Dong Hyun
(74) *Attorney, Agent, or Firm* — Myers Wolin, LLC

(57) ABSTRACT

A wireless communication system includes a multi service supplying unit which transmits the same data to a plurality of user equipment and a quality evaluation result collecting unit which collects quality evaluation results of a multi service from the plurality of user equipment. The wireless communication system includes a resource controlling unit which controls shared wireless communication resources used for the multi service according to the quality evaluation results.

6 Claims, 15 Drawing Sheets

FIG. 5

| ITEM | PARAMETER NAME | CONTENTS | REMARK |
|---|---|---|---|
| 1 | MBSFN Area ID | ID FOR IDENTIFYING MBSFN AREA | |
| 2 | Cell ID | ID FOR IDENTIFYING CELL | |
| 3 | UE-ID | ID FOR IDENTIFYING UE (C-RNTI AND THE LIKE) | WHEN REPORTING BY CCCH |
| 4 | Service ID | ID FOR IDENTIFYING MBMS SERVICE (CHANNEL) | |
| 5 | RECEIVING QUALITY | RECEIVING QUALITY MEASUREMENT VALUE OF MBMS SERVICE INDICATED BY Service ID | |

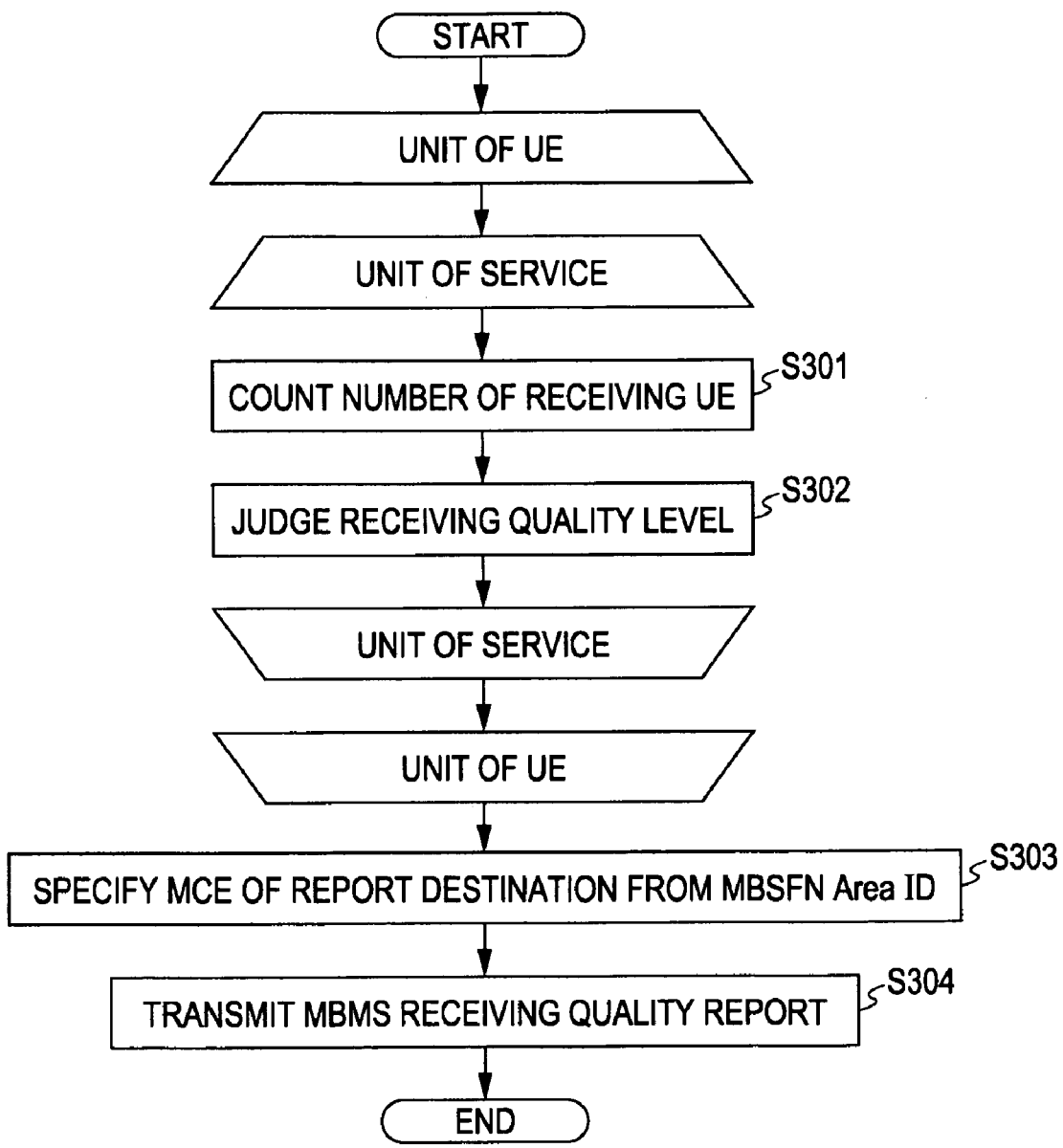

FIG. 7

| ITEM | PARAMETER NAME | CONTENTS | REMARK |
|---|---|---|---|
| 1 | MBSFN Area ID | ID FOR IDENTIFYING MBSFN AREA | |
| 2 | Cell ID | ID FOR IDENTIFYING CELL | |
| 3 | Service ID | ID FOR IDENTIFYING MBMS SERVICE (CHANNEL) | |
| 4 | RECEIVING UE NUMBER | TOTAL NUMBER OF UE RECEIVING MBMS SERVICE INDICATED BY Service ID | NUMBER OF UE REPORTING RECEIVING QUALITY WHILE eNodeB IS WAITING |
| 5 | NUMBER OF UE IN RECEIVING QUALITY LEVEL [1] | NUMBER OF UE IN RECEIVING QUALITY LEVEL [1] IN MBMS SERVICE SHOWN BY Service ID | |
| ... | ... | ... | ... |
| 14 | NUMBER OF UE IN RECEIVING QUALITY LEVEL [N] | NUMBER OF UE IN RECEIVING QUALITY LEVEL N IN MBMS SERVICE SHOWN BY Service ID | N=10 IN THIS EMBODIMENT |

FIG. 8

| Service Id | LV | Number of UE | | | | |
| --- | --- | --- | --- | --- | --- | --- |
| | | eNB#1 | eNB#2 | ... | eNB#n | Total |
| Service#1 | 10 | 0 | 0 | ... | 0 | 0 |
| | 9 | 0 | 0 | | 1 | 1 |
| | 8 | 1 | 0 | | 0 | 1 |
| | 7 | 0 | 0 | | 0 | 0 |
| | 6 | 0 | 1 | | 0 | 1 |
| | 5 | 0 | 0 | | 0 | 0 |
| | 4 | 0 | 0 | | 0 | 0 |
| | 3 | 1 | 0 | | 0 | 1 |
| | 2 | 0 | 0 | | 0 | 0 |
| | 1 | 0 | 0 | | 0 | 0 |
| ⋮ | ⋮ | ⋮ | ⋮ | ... | ⋮ | ⋮ |
| Service#m | 10 | 0 | 0 | ... | 0 | 0 |
| | 9 | 0 | 0 | | 1 | 1 |
| | 8 | 1 | 0 | | 0 | 1 |
| | 7 | 0 | 0 | | 0 | 0 |
| | 6 | 0 | 1 | | 0 | 1 |
| | 5 | 0 | 0 | | 0 | 0 |
| | 4 | 0 | 0 | | 0 | 0 |
| | 3 | 1 | 0 | | 0 | 1 |
| | 2 | 0 | 0 | | 0 | 0 |
| | 1 | 0 | 0 | | 0 | 0 |

FIG. 11

| ITEM | PARAMETER NAME | CONTENTS | REMARK |
|---|---|---|---|
| 1 | MBSFN Area ID | ID FOR IDENTIFYING MBSFN AREA | |
| 2 | Cell ID | ID FOR IDENTIFYING CELL | |
| 3 | Service ID | ID FOR IDENTIFYING MBMS SERVICE (CHANNEL) | |
| 4 | RESOURCE INFORMATION | INFORMATION OF NEW RESOURCES FOR USE IN MBMS SERVICE (CHANNEL) INDICATED BY Service ID | |

WIRELESS COMMUNICATION SYSTEM, WIRELESS BASE STATION, USER EQUIPMENT, AND MULTI SERVICE MANAGEMENT EQUIPMENT

CROSS-REFERENCE TO RELATED APPLICATION(S)

This application is based upon and claims the benefit of priority of the prior Japanese Patent Application No. 2008-88393, filed Mar. 28, 2008, the entire contents of which are incorporated herein by reference.

BACKGROUND

1. Field

The present invention relates to a wireless communication system that provides multi service for transmitting the same data to a plurality of user equipment units, and also relates to a wireless base station, a user equipment and a multi service management equipment that forms the system.

2. Description of the Related Art

Services realized and provided in a mobile communication system heretofore include services for supplying information to an unspecified number of users such as broadcast services and multicast services, in addition to user specific services such as voice communication and packet communication (electronic mail service and Web access service).

Recently, a system taking into account the user individual services and the common data supply services has been similarly examined in a 3G system and an LTE (Long Term Evolution) system regarded as the next generation of mobile communication systems.

As one technique for realizing the multi service supplying the same data to many terminals, a user data synchronization method represented by MBSFN (Multimedia Broadcast multicast service Single Frequency Network) has been proposed. In this proposed method, a predetermined period for synchronization is set in the data transmitted in a plurality of areas to synchronize between the user data transmitted from different wireless base stations in order to maintain continuity of data reception/data synchronization in the user equipment.

Specifically, when a plurality of wireless base stations (eNodeB) form an MBSFN area, the MBMS (Multimedia Broadcast multicast service) data is the data of the multi service and is delivered to user equipment (UEs) according to the following procedures. The MBMS is described in the 3GPP TS 36.300 V8.2.0.

Procedure 1: An MCE (Multi-cell/multicast Coordination Entity), which is a management equipment for managing a multi service, controls a subordinate wireless base station (eNodeB) and a multi service gateway (EMBMS-GW) which is the data source of the multi service so that the same (time/frequency) wireless resources are used within the MBSFN area as for one service. The wireless base station is controlled through an M2 interface and the multi service gateway is controlled through an M3 interface. The M1 interface is an interface between the EMBMS-GW and the eNodeB, the M2 interface is an interface between the MCE and the eNodeB and the M3 interface is an interface between the MCE and the EMBMS-GW.

Procedure 2: According to IP multicast, the MBMS data is delivered from the multi service gateway (EMBMS-GW) to the wireless base stations (eNodeBs) in the MBSFN area through an M1 interface. The SYNC information such as time stamp is set in the delivered MBMS data in order to perform the synchronization among the wireless base stations (eNodeBs) (to synchronize the transmission timing from the eNodeBs).

Procedure 3: The wireless base station (eNodeB) delivers the MBMS data to the user equipments (UEs) according to the specified SYNC information such as the time stamp.

In the mobile communication system, an area structure (service area range of the base station) formed by a wireless base station (eNodeB) is not uniform and obviously the structure changes according to the condition of the base station and the propagation environment. Therefore, in the mobile communication system, the range in which services can be offered is different even among the wireless base stations having the same performance such as transmission power.

It is a rare case that the user equipment can receive a signal in a line of sight channel even when it is a signal received from the same wireless base station (cell). That is the user equipment generally receives diffraction waves, reflection waves, and delayed waves.

Therefore, in the mobile communication system, generally, the user equipment handles the first choice wave (a signal having the highest reception level and a signal arriving fastest) as a main signal.

Specifically, in unicast communication, quality of the currently received signal is reported from the user equipment to the wireless base station. The wireless base station performs a dynamic control of the wireless resources to use according to the quality information reported from the user equipment, thereby improving the receiving quality of the user equipment as necessary.

In the MBSFN, however, there is no scheme to report the receiving quality of an MBMS service from the user equipment to the base station. Therefore, when the quality of the MBMS data received in the user equipment has deteriorated, the wireless base station may not detect this fact.

Since the MBMS service that is poor in receiving quality may not be improved, the required receiving quality of the MBMS service may not be secured in the user equipment.

In ordinary unicast communication, the user equipment reports the receiving quality information such as Channel Quality Indicator (CQI) and the amount of interference to the wireless base station. The wireless base station dynamically controls the wireless resource to be allocated, based on the report from the user equipment, to maintain the receiving quality.

On the other hand, as mentioned above, in the MBSFN area, reporting the receiving quality from the user equipment to the wireless base station is not performed. Therefore, the wireless base station may not improve the defects of deteriorating the receiving quality in the MBMS service even upon detection of the following situations: the case where a delayed wave of the same service (same channel) is received in the MBSFN area; the case where a radio wave that can be an interference is received from a neighboring unicast cell or SC-MBMS (Single-Cell transmission MBMS) cell outside of the MBSFN area; and the case where an interference wave between the MBSFN areas when a plurality of MBSFN areas are formed and each MBSFN area operates asynchronously.

The wireless base stations in the MBSFN area share the same wireless resource for every MBMS service. Therefore, even when a user equipment reports the receiving quality to the wireless base station, the wireless base station which received the report may not control the wireless resource for itself in order to improve the receiving quality. This is also a problem to be solved in order to improve the receiving quality in the MBMS service.

There is a technique for managing receiving quality in the case of transmitting the same data to a plurality of user equipment, in which, for example, a lowest value in the receiving quality of the delivered data is provided and the quality of the delivered data is set according to the device having the lowest receiving quality of the devices which receive data in the quality of the lowest value or higher (for example, refer to Japanese Laid-Open Patent Publication No. 2006-304067).

The above-mentioned conventional technique, however, may not improve the deterioration itself in the receiving quality caused by the delayed wave or the interference wave. Since a plurality of wireless base stations share the wireless resources, there still remains unsettled problems of the MBMS in that the receiving quality may not be controlled for every wireless base station.

SUMMARY

According to an embodiment of the invention, a wireless communication system includes a multi service supplying unit which transmits same data to a plurality of user equipment and a quality evaluation result collecting unit which collects quality evaluation results of a multi service from the plurality of user equipment. The wireless communication system includes a resource controlling unit which controls shared wireless communication resources used for the multi service according to the quality evaluation results.

The object and advantages of the embodiments will be realized and attained by means of the elements and combinations particularly pointed out in the claims.

It is understood that both the foregoing general description and the following detailed description are exemplary and explanatory only and are not restrictive of the invention, as claimed.

BRIEF DESCRIPTION OF THE DRAWINGS

FIG. 5 is an explanatory table describing additional parameters for an MBMS receiving quality report;

FIG. 6 is a flow chart describing the processing operation of a wireless base station;

FIG. 7 is an explanatory table describing parameters for a schedule reset request;

FIG. 8 is an explanatory table describing an example of collected information about the number of user equipments in the multi-cell/multicast coordination entity;

FIG. 11 is an explanatory table describing parameters for a rescheduling setting report;

DESCRIPTION OF EMBODIMENTS

Hereinafter, an exemplary embodiment will be described in detail with reference to the drawings.

Figure 1:
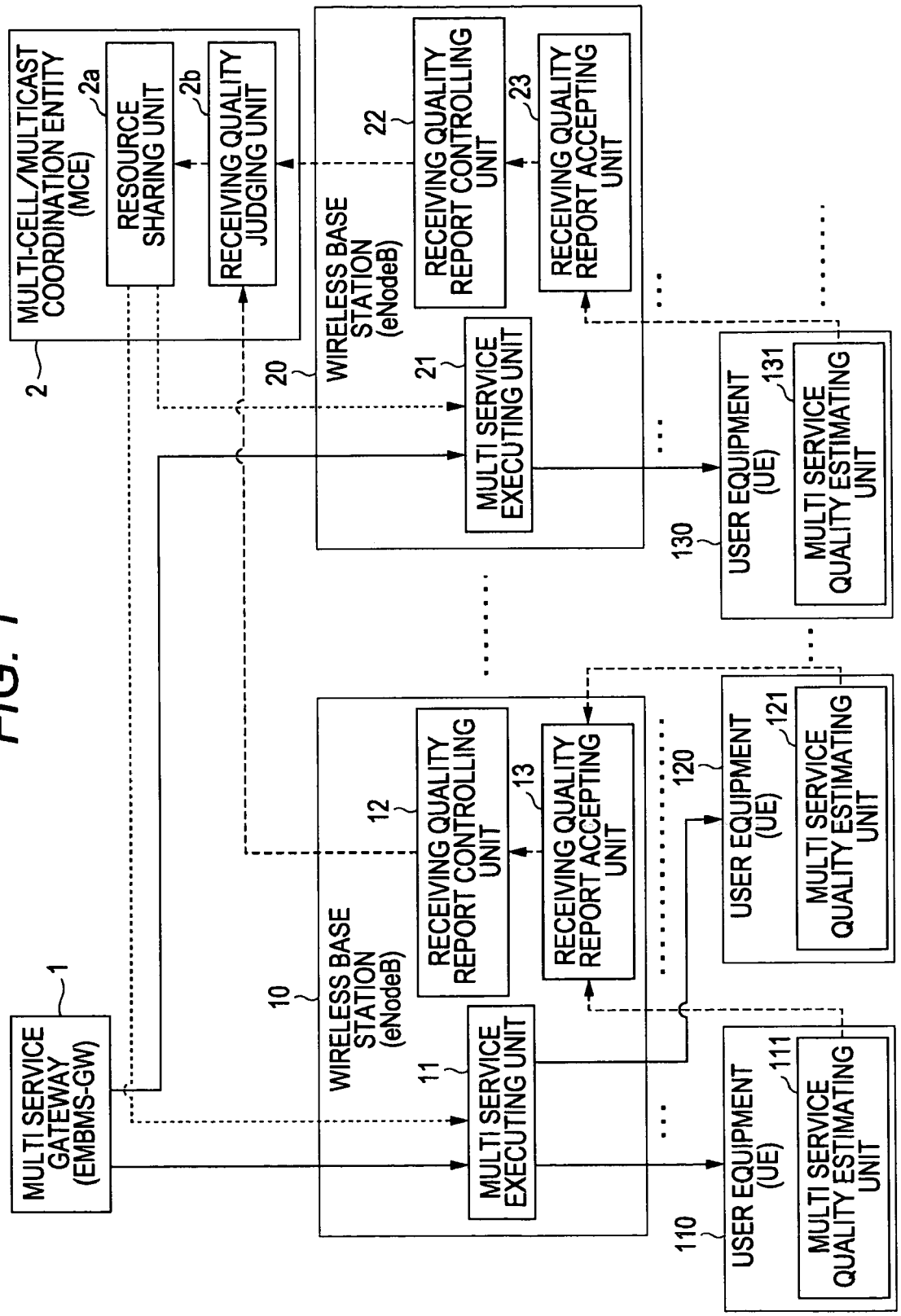
FIG. 1 is a diagram illustrating the schematic structure of a wireless communication system according to an embodiment.

FIG. 1 is a diagram useful in illustrating the schematic structure of a wireless communication system in certain embodiments of the invention. In the wireless communication system illustrated in FIG. 1, a plurality of wireless base stations (eNodeBs) are connected to a multi service gateway (EMBMS-GW) 1 and each wireless base station communicates with user equipment (UEs) respectively.

The multi service gateway 1 delivers multi service data to each of the wireless base stations and each of the wireless base stations transmits the received service data to the user equipment served by the station. For example, the wireless base station 10 includes a multi service executing unit 11. The multi service executing unit 11 transmits the multi service data to user equipment 110 and 120. Similarly, the wireless base station 20 includes a multi service executing unit 21 which transmits the multi service data to a user equipment 130.

Upon receipt of the multi service data from the wireless base station, each of the user equipment evaluates the quality of the data and reports the evaluation result to the wireless base station. For example, the user equipments 110 and 120 evaluate the quality of the received multi service by multi service quality evaluating units 111 and 121, respectively. Then, the user equipment 110 and 120 report the evaluation results to the wireless base station 10. Similarly, the user equipment 130 evaluates the quality of the received multi service by the multi service quality evaluating unit 131 and reports the evaluation result to the wireless base station 20.

The wireless base station receives the report of the receiving quality from the user equipment served by the station and outputs the received report to the multi-cell/multicast coordination entity 2. For example, in the wireless base station 10, a receiving quality report accepting unit 13 receives the reports from the user equipment 110 and 120. Then, a receiving quality report controlling unit 12 outputs the reports collectively to the multi-cell/multicast coordination entity 2. Similarly, in the wireless base station 20, a receiving quality report accepting unit 23 receives the report from the user equipment 130 and a receiving quality report controlling unit 22 outputs the report to the multi-cell/multicast coordination entity 2.

In the multi-cell/multicast coordination entity (MCE) 2, a receiving quality judging unit 2b receives the reports from the respective wireless base stations, collects the receiving quality from the user equipment in the whole area of the multi service, and evaluates the receiving quality. Then, a resource sharing unit 2a determines the share of resources for the multi service based on the evaluation result by the receiving quality judging unit 2b and reports the determined share of resources to the wireless base stations.

Namely, when the wireless communication system illustrated in FIG. 1 provides an MBMS service, the wireless communication system collects the quality state of this service from the user equipment receiving the service. Then, the wireless communication system performs a transmission control of the MBMS service as necessary, to control the receiving quality of the MBMS service in the user equipment to be always in the best condition.

Figure 2:
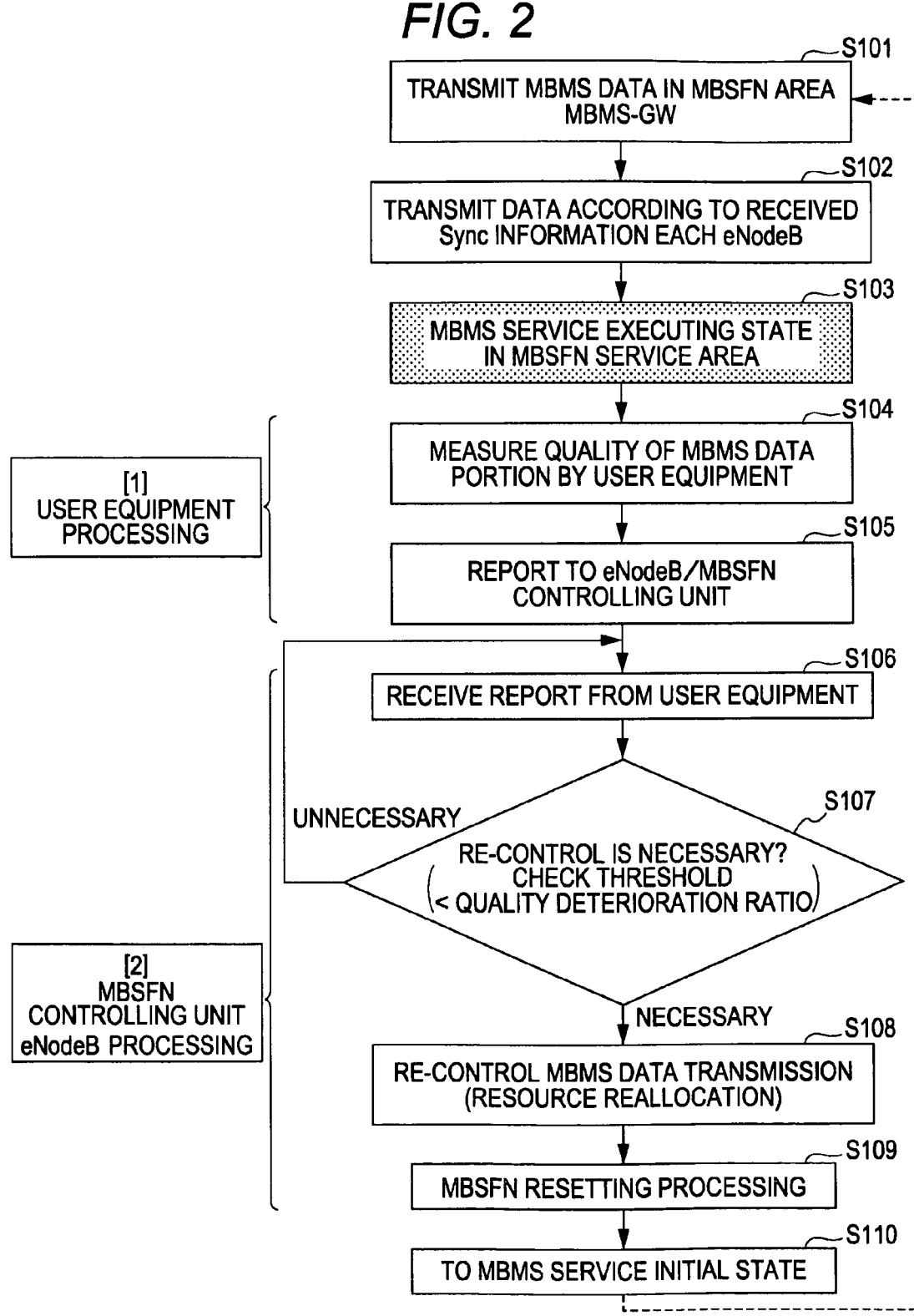
FIG. 2 is a flow chart describing the processing operation of the wireless communication system.

FIG. 2 is a flow chart explaining a processing operation of the wireless communication system illustrated in FIG. 1. In the flow chart illustrated in FIG. 2 the multi service gateway (EMBMS-GW) transmits the MBMS data to the MBSFN area (Step S101). Next, each of the wireless base stations (eNodeBs) performs the data transmission to the user equipments, according to the received synchronization information (SYNC information) (Step S102).

The user equipment within the MBSFN service area receives the MBMS service (Step S103). The user equipment measures the receiving quality of a part of the MBMS data (Step S104). The user equipment reports the measured receiving quality to the multi-cell/multicast coordination entity (MBSFN control unit) through the eNodeB (Step S105).

The multi-cell/multicast coordination entity 2 receives the report of the measured receiving quality from the user equipment (Step S106). The multi-cell/multicast coordination entity checks the necessity for resetting processing of the MBMS service based on the quality information received from the user equipment (Step S107). This check is performed, for example, by comparison between a reported deterioration ratio of the quality and a threshold for the check.

The multi-cell/multicast coordination entity 2 repeats Step S106 and Step S107 until it determines that re-control is necessary. When the multi-cell/multicast coordination entity 2 determines that re-control is necessary (Yes in Step S107), it allocates a new resource to the MBMS service (Step S108). The multi-cell/multicast coordination entity 2 reports the change in the setting to the wireless base station and delivers the MBMS service in the newly allocated wireless resource (Step S109), and moves to the initial state (Step S110).

In this way, the user equipment measures the receiving quality when receiving an MBMS data and reports the measured quality to the multi-cell/multicast coordination entity through the wireless base station. The wireless base station and the multi-cell/multicast coordination entity change the wireless resource allocated to the MBMS data as necessary based on the receiving quality information collected from the user equipment. Accordingly, it is possible to maintain the receiving quality of an MBMS service in a MBSFN area.

Figure 3:
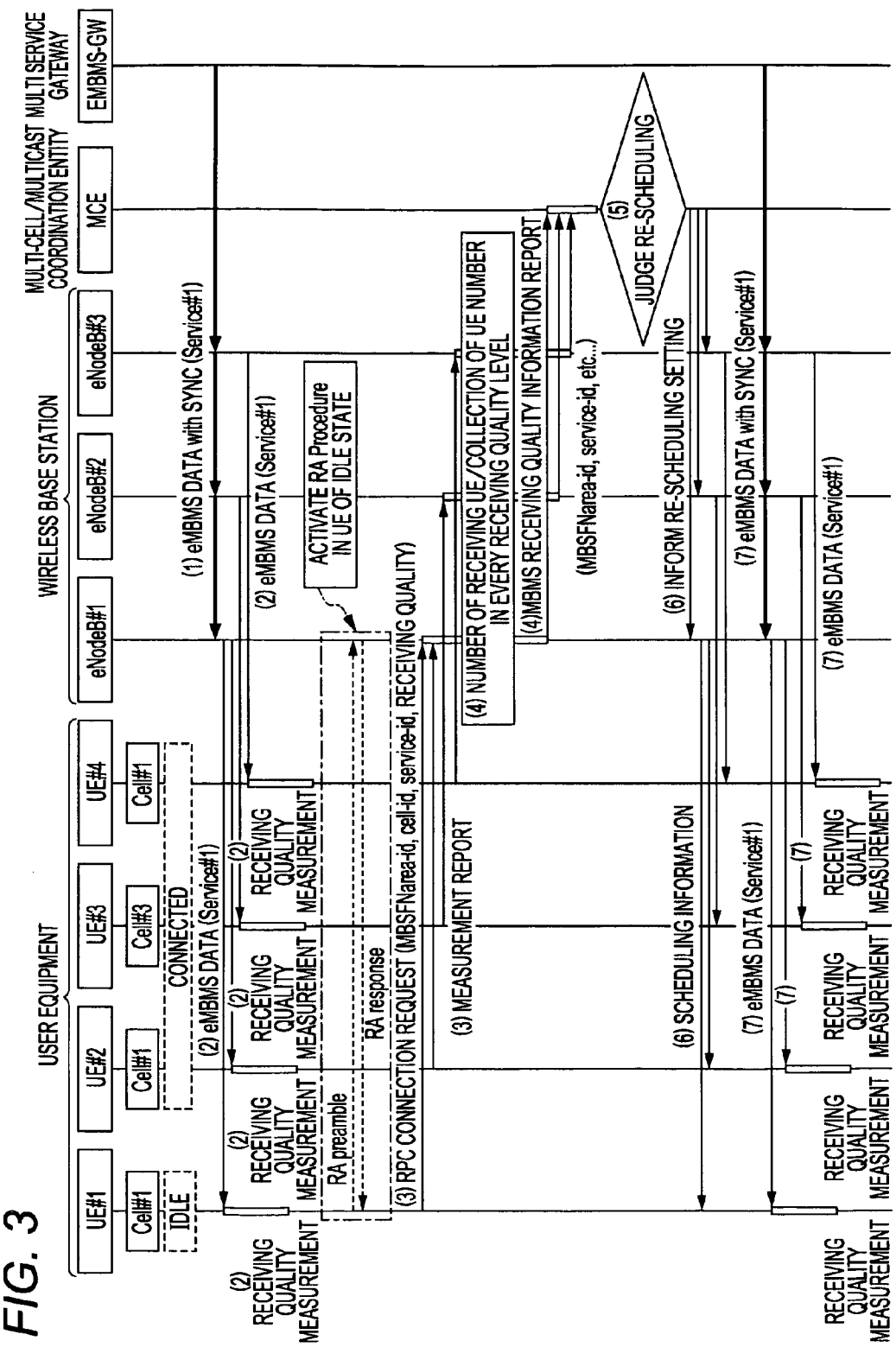
FIG. 3 is an explanatory view describing the processing of the wireless communication system.

FIG. 3 is an explanatory view describing the processing of the wireless communication system illustrated in FIG. 1. Specifically, it is a sequence diagram of the operations for resetting the wireless resource to be allocated to an MBMS service in a state where a plurality of user equipment receives the same MBMS service.

In the operation (1), the user equipments (UE#1 to UE#4) are present in an MBSFN area #1, in a state of receiving the MBMS service (Service#1). The MBMS data is delivered from the multi service gateway (EMBMS-GW) to the wireless base stations (eNodeB#1 to eNodeB#3) in the IP multicasting.

In the operation (2), the MBMS data of Service#1 is delivered from the wireless base stations (eNodeB#1 to eNodeB#3) to the user equipments (UE) at the same timing according to the SYNC information.

Upon receipt of the MBMS data of Service#1, the user equipment (UE#1 to UE#4) measure the receiving quality of the received MBMS data. At this time, in this embodiment, the user equipment UE#1 is in the RRC_IDLE state which means no RRC connection has established between the user equipment (UE) and the wireless base station (eNodeB) and the user equipment (UE#2 to UE#4) are in the RRC_CONNECTED state which means RRC connection has established between the user equipment (UE) and the wireless base station (eNodeB).

In the operation (3), the user equipment (UE#1 to UE#4) report the receiving quality of the Service#1 measured in the operation (2) to the wireless base stations (eNodeB#1 to eNodeB#3).

Figure 4:
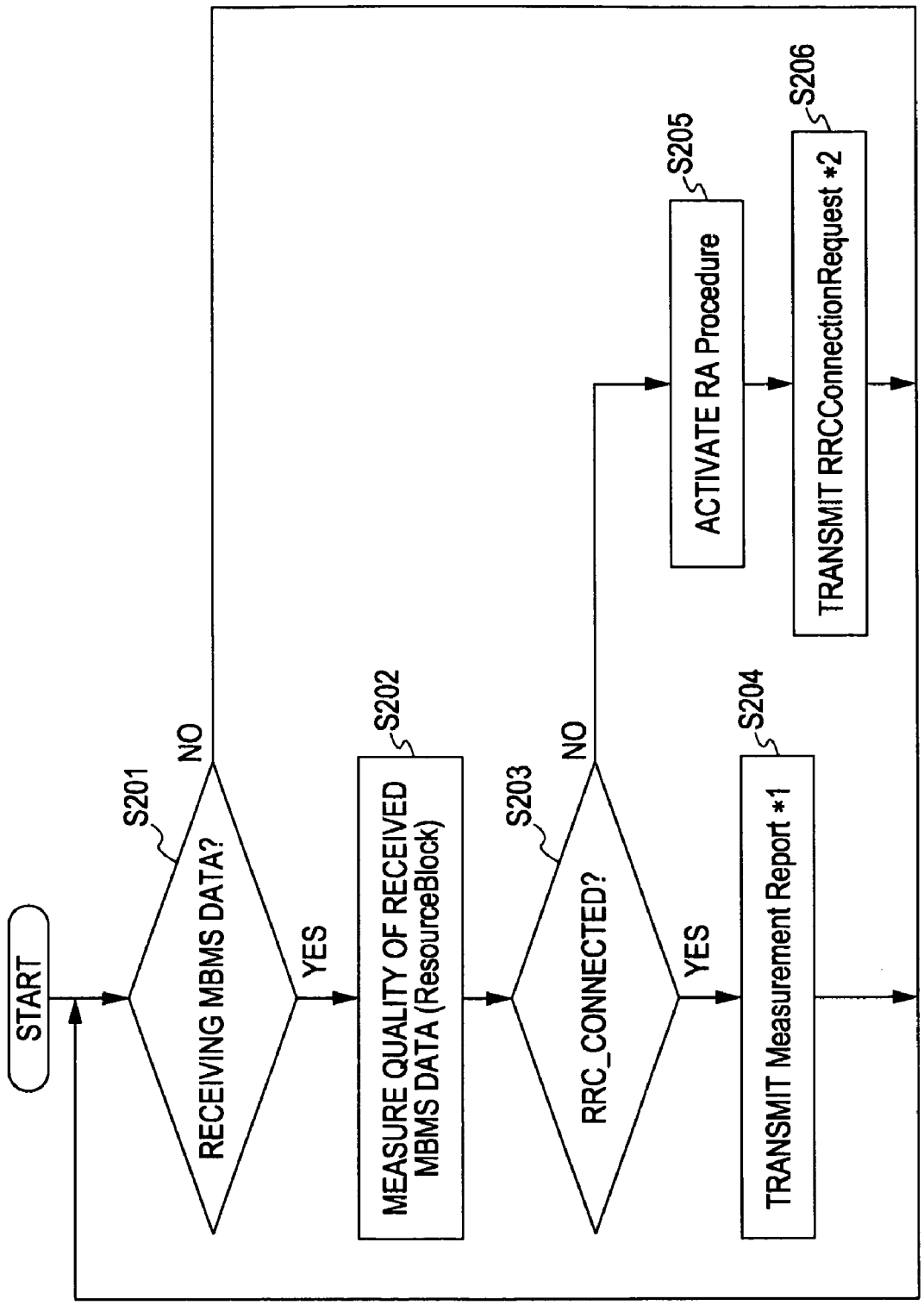
FIG. 4 is a flow chart of receiving quality reporting processing by a user equipment.

FIG. 4 illustrates a receiving quality reporting flow in which the user equipment reports a receiving quality measurement result to the wireless base station. When the user equipment is receiving the MBMS service (Yes in Step S201), it reports the measurement result to the wireless base station after measuring the receiving quality of the ResourceBlock. At this time, the user equipment in the IDLE state can also receive the MBMS service. Therefore, there are two types of procedures according to the state of RRC connection of the user equipment.

(*1) In the user equipment in the RRC CONNECTED state (Yes in Step S203), the measurement result is reported in the MEASUREMENT REPORT (DCCH) (Step S204) and the operation is returned to Step S201.

(*2) The user equipment which is receiving the MBMS (Yes in Step S201) but is in the RRC_IDLE state (No in Step S203) starts up the RA procedure (Step S205). With this, the user equipment reports the measurement result using the MSG 3 (MESSAGE (CCCH) corresponding to RRC CONNECTION REQUEST) (Step S206) and the operation is returned to Step S201.

The user equipment which is receiving the MBMS in the RRC_IDLE state can move into the RRC_Connected state and transmit the Measurement Report according to the method in (*1), hence the same effects can be obtained, which is one of the methods assumed based on the above technique.

At this time, parameters illustrated in FIG. 5 are newly defined in the Message corresponding to the RRC CONNECTION REQUEST or the MEASUREMENT REPORT in order to distinguish the MBMS service. When there is a predefined parameter for Cell-ID in FIG. 5, the predefined one is used. Since the user equipment can receive a plurality of MBMS services, it is configured to report the receiving quality for every service.

In the additional parameters for MBMS receiving quality report illustrated in FIG. 5, the parameters of such items as "MBSFN Area ID" which is an ID for identifying an MBSFN area, "Cell ID" which is an ID for identifying a cell, "UE-ID" which is an ID (C-RNTI, etc.) for identifying UE when reporting in the CCCH, "Service ID" which is an ID for identifying an MBMS service (channel), and "receiving quality" that is a receiving quality measurement value of the MBMS service shown by the Service ID are added. This identification information is only an example and the names and parameters are not limited to these.

Referring back to FIG. 3, in the operation (4), the wireless base station (eNodeB) waits for the measurement result report from other user equipment UE which are receiving the MBMS for a predetermined time since it received the first report from a user equipment (UE). After the predetermined time, the base station determines the receiving quality level based on the reports having been received from the user equipment (UEs) and totals up the following information for every service.

FIG. 6 illustrates an MBMS receiving quality reporting flow showing the processing operation of the wireless base station (eNodeB) from receiving a report from the user equipment (UE) to transmitting an MBMS receiving quality report to the MCE. As illustrated in FIG. 6, the wireless base station counts the number of receiving user equipment for every service (Step S301), determines the receiving quality level (Step S302), and repeats these steps for every user equipment.

The wireless base station identifies the multi-cell/multicast coordination entity (MCE) of the reporting destination from the MBSFN Area ID (Step S303), transmits the MBMS receiving quality report (Step S304), and completes the processing.

At this time, the parameters illustrated in FIG. 7 are newly added to the message to be reported to the MCE by the M2 interface (the interface between the multi-cell/multicast coordination entity and the wireless base station).

In the parameters for schedule resetting request illustrated in FIG. 7, the parameters of such items as "MBSFN Area ID" which is an ID for identifying an MBSFN area, "Cell ID" which is an ID for identifying a cell, "Service ID" which is an ID for identifying an MBMS service (channel), "receiving UE number" showing the total number of UEs which receive the MBMS service shown by the Service ID (the number of UEs which reported the receiving quality while the eNodeB is waiting for the reports), and "UE number in receiving quality level [1]" to "UE number in receiving quality level [N]" showing the number of UEs in each receiving quality level in the MBMS service shown by the Service ID. This identification information is only an example, and the names and parameters are not limited to these.

Referring back to FIG. 3, in the operation (5), the multi-cell/multicast coordination entity (MCE) receives the MBMS receiving quality report from the wireless base station (eNodeB) in the MBSFN area. At this time, the multi-cell/multicast coordination entity waits for the MBMS receiving quality report from other wireless base stations (eNodeBs) in the MBSFN area for a predetermined time from the receipt of the first MBMS receiving quality report.

After the predetermined time, the multi-cell/multicast coordination entity totals up the number of user equipment for every receiving quality level and calculates the average of the MBMS receiving quality level for every MBMS service using the formula (1) based on the information from a received receiving quality report. FIG. 8 is an example of the collected information on the number of the user equipment for every receiving quality level in the multi-cell/multicast coordination entity (MCE).

$$\text{Average}(ServiceId) = \frac{\sum_{RxQualityLevel=1}^{N} UE \text{ number}(RxQualityLevel) \times WeightingFactor}{\text{Total } number of \text{ } UEs \text{ reported the } receiving quality(ServiceId)} \quad (1)$$

Referring back to FIG. 3, in the operation (6), the multi-cell/multicast coordination entity (MCE) makes a comparison between the average of the receiving quality levels for every MBMS service calculated in the operation (5) and an index of the receiving quality levels stored in the multi-cell/multicast coordination entity (MCE). When the receiving quality is lower than the quality of the index, the multi-cell/multicast coordination entity (MCE) searches for an empty resource block that can be allocated in a direction of a frequency axis from the resource block used in the corresponding MBMS service. Then, when there is an available empty resource block, the multi-cell/multicast coordination entity informs all the wireless base stations in the area to deliver the MBMS service in the newly allocated resource block.

Figure 9:
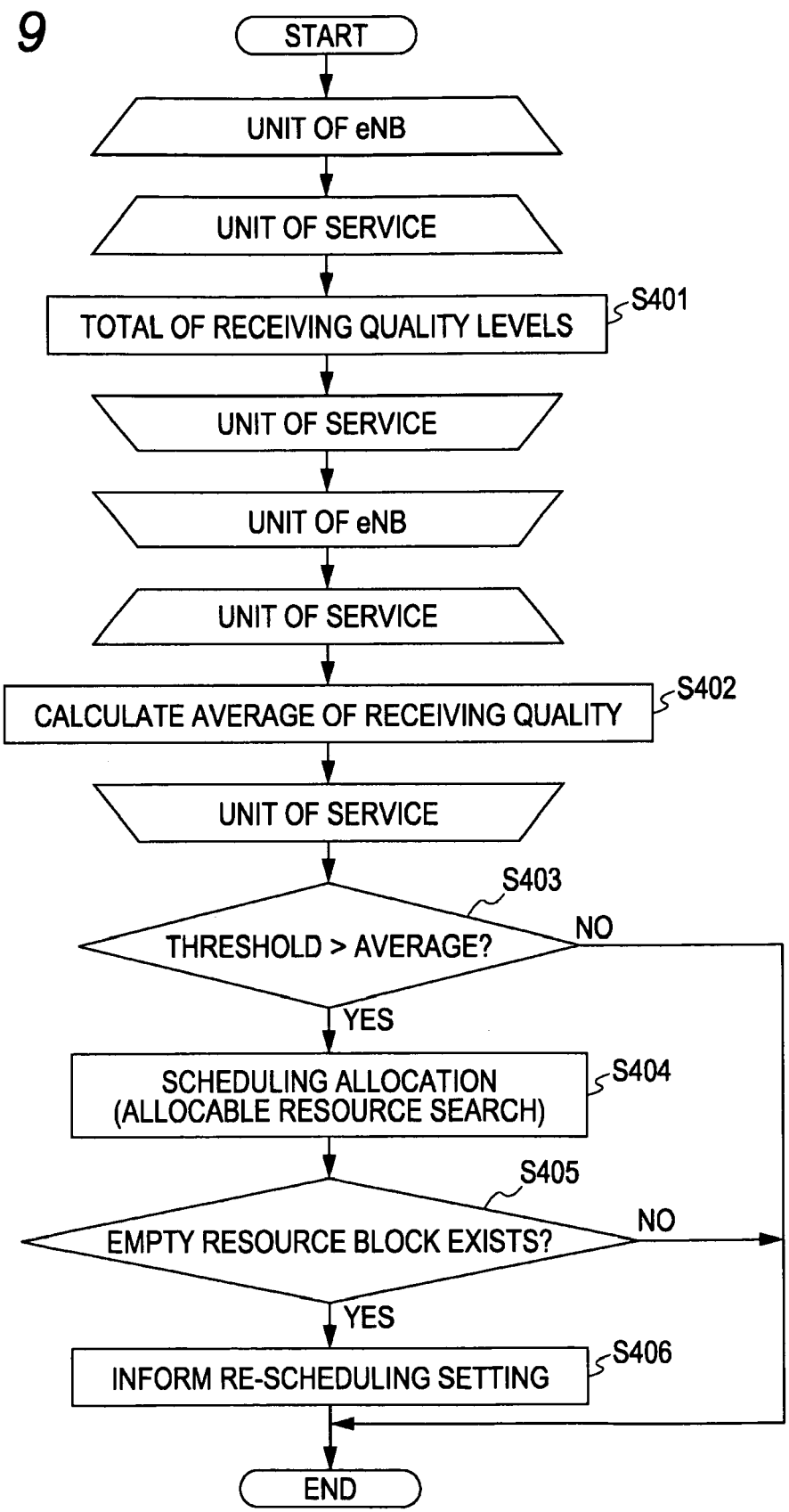
FIG. 9 is a flow chart describing rescheduling setting in the multi-cell/multicast coordination entity.
Figure 10:
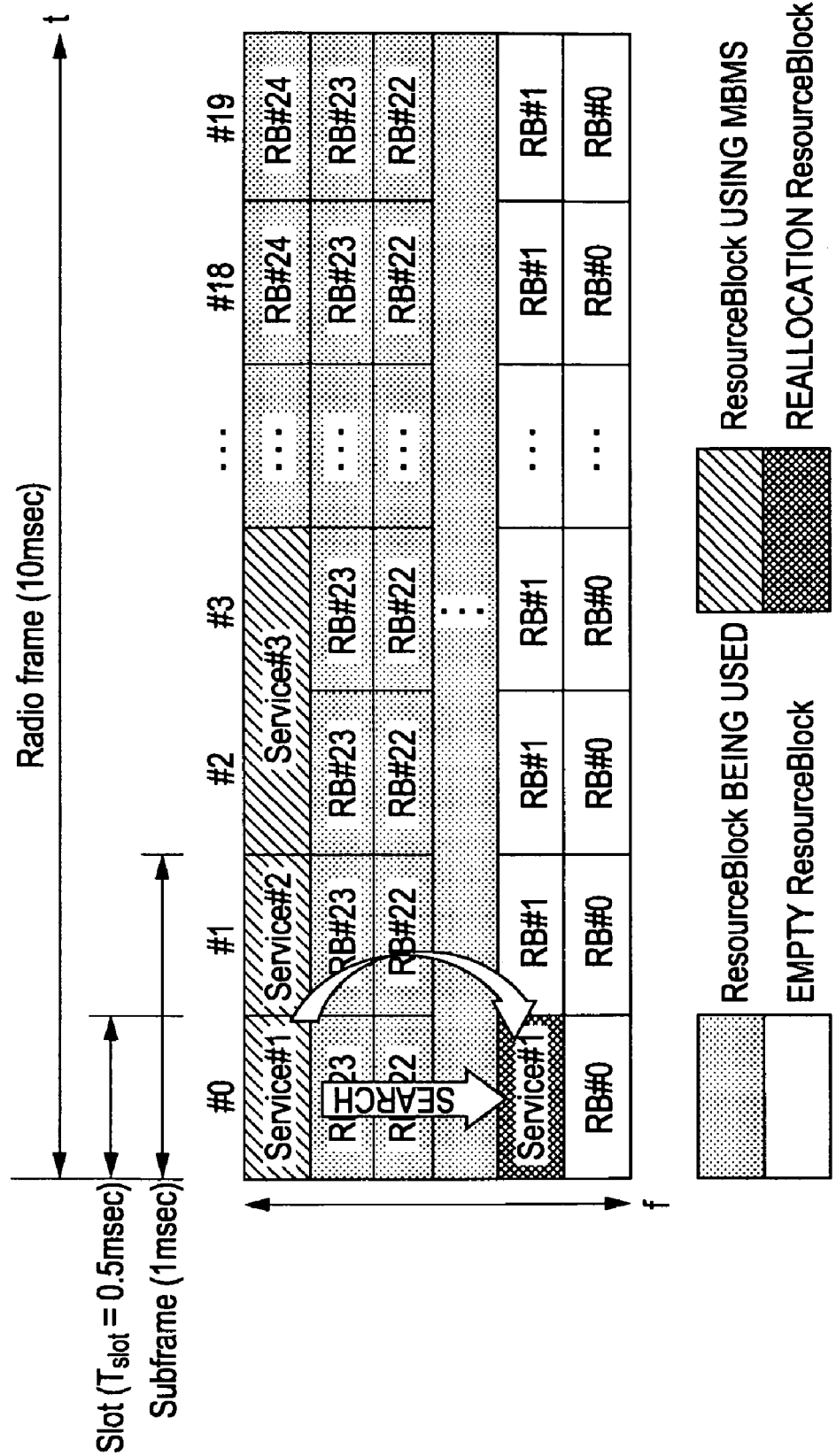
FIG. 10 is an explanatory view describing reallocation of the resources in the multi-cell/multicast coordination entity (MCE)

FIG. 9 is a flow chart showing a rescheduling setting in the multi-cell/multicast coordination entity (MCE). FIG. 10 is an explanatory view describing the reallocation of resources in the multi-cell/multicast coordination entity (MCE).

In FIG. 9, at first, the multi-cell/multicast coordination entity totals up the receiving quality levels for every service and for every wireless base station (eNodeB) (Step S401), and calculates the average of the receiving quality for every service (Step S402).

When the calculated average value is not less than a threshold (No in Step S403), the multi-cell/multicast coordination entity (MCE) terminates the processing. When the average value is less than the threshold (Yes in Step S403), the MCE searches for an allocable resource from the wireless communication resources (Step S404).

As a result, when there is an empty resource block in the wireless communication resources (Yes in Step S405), the MCE allocates the service to the empty resource and transmits the rescheduling setting information to the wireless base stations (Step S406) and terminates the processing.

In FIG. 10, the receiving quality average of the Service#1 is less than the threshold. The multi-cell/multicast coordination entity (MCE) searches for an empty resource in a different frequency slot, of the time slot #0 used by the Service#1. Then, the Service#1 is reallocated to the resource block RB#1 which is an empty resource.

The multi-cell/multicast coordination entity (MCE) adds the information items illustrated in FIG. 11 to the message of the M2 interface to inform the wireless base stations (eNodeBs) of the different resource. In the parameters for rescheduling setting information illustrated in FIG. 11, such information items as "MBSFN Area ID" which is an ID for identifying an MBSFN area, "Cell ID" which is an ID for identifying a cell, "Service ID" which is an ID for identifying an MBMS service (channel), and "resource information" which is information on the new resource used in the MBMS service (channel) shown by the Service ID. This identification information is only an example and the names and parameters are not limited to these.

Referring back to FIG. 3, in the operation (7), the user equipment (UE) starts receiving the MBMS service in the new wireless resource informed from the wireless base station (eNodeB) in the operation (6).

As described above, when the receiving quality of the MBMS service deteriorates, in such cases where a delayed wave of the same service (the same channel) is received in the MBSFN area, where a radio wave that can be an interference is received from a neighboring unicast cell or SC-MBMS cell outside the MBSFN area, or where a plurality of MBSFN areas are formed, each MBSFN area operating asynchronously, and an interference wave between the MBSFN areas is received, the wireless base station can detect the above situation and improve it.

Figure 12:
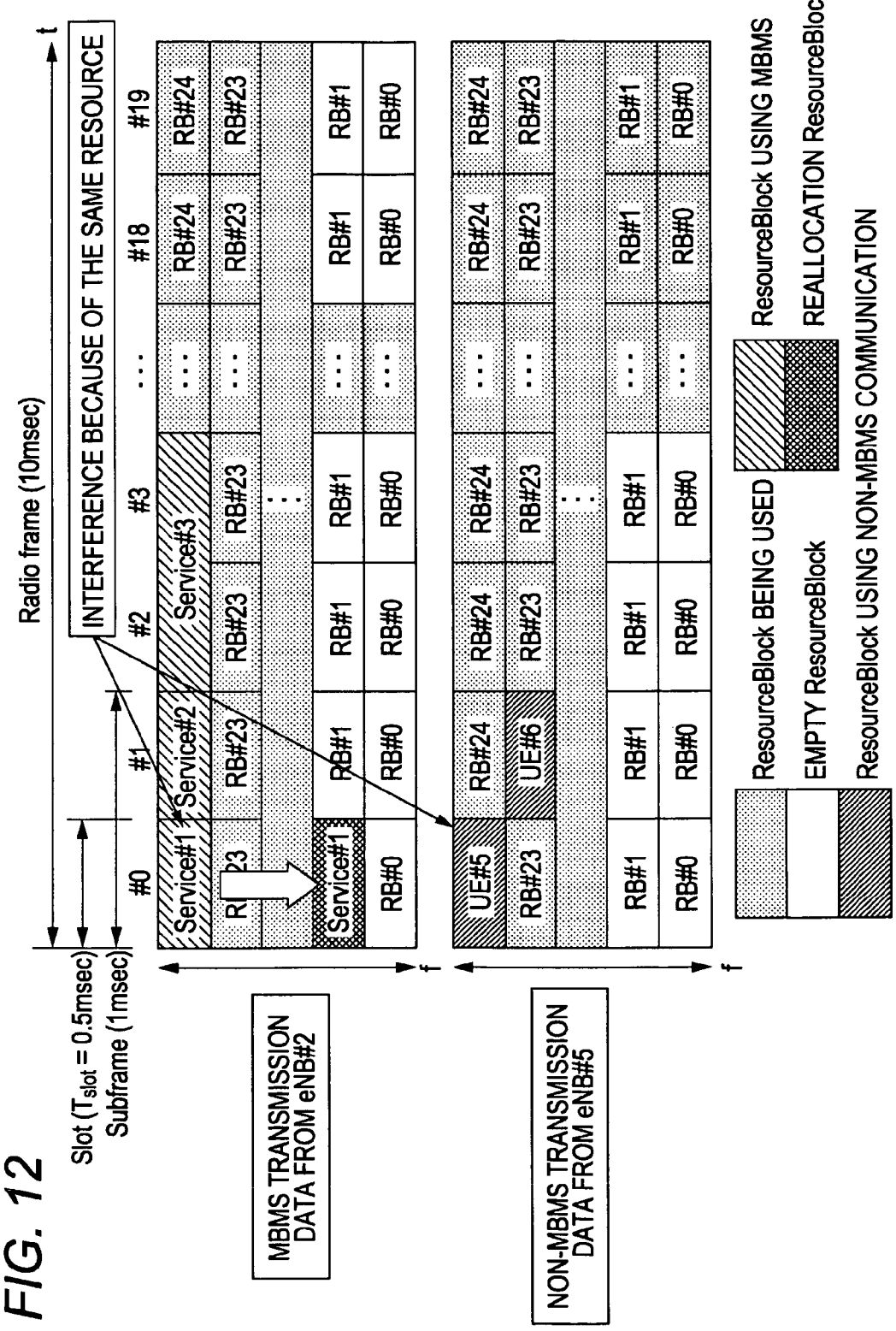
FIG. 12 is an explanatory view describing avoidance of interference by reallocation of resources.

For example, as illustrated in FIG. 12, in a case where a certain user equipment receives data of an expected MBMS service (Service#1) from the wireless base station eNodeB#2 and at the same time, receives data of an unicast communication using the same resource from the wireless base station eNodeB#5, which is intended for another user equipment, interference occurs and the receiving quality is deteriorated. The degree of deterioration in the receiving quality may be greater depending on the transmission power of the unicast communication from the wireless base station eNodeB#5. By carrying out the procedures shown in this embodiment, the service (Service#1) can be received through the new resource and the deterioration in the receiving quality caused by the interference can be solved.

Figure 13:
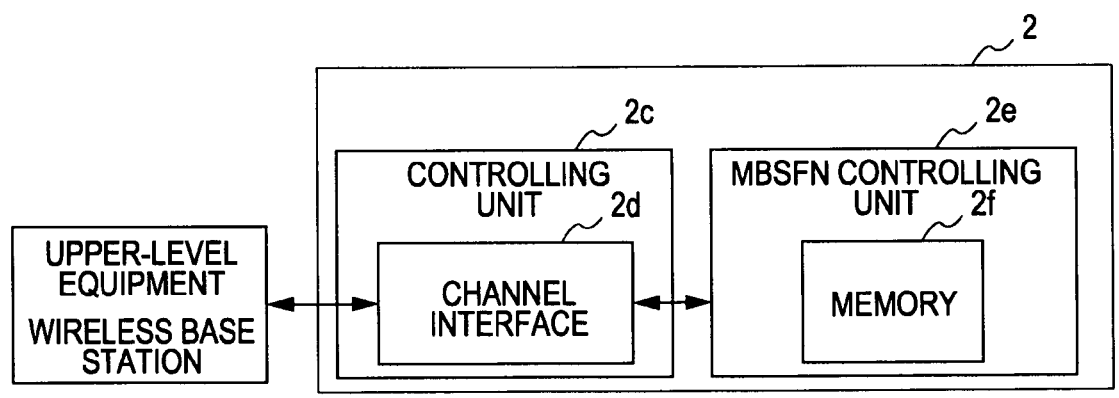
FIG. 13 is a diagram illustrating a structure example of the multi-cell/multicast coordination entity.

Next, a specific structure example of the wireless communication system will be described. FIG. 13 is a diagram describing the structure example of the multi-cell/multicast coordination entity (MCE) 2. The multi-cell/multicast coordination entity 2 includes a controlling unit 2c and an MSBFN controlling unit 2e.

The controlling unit 2c communicates with an upper-level equipment and a wireless base station through a channel interface 2d. The MBSFN controlling unit 2e controls the setting and the scheduling of the wireless resources of an MBMS service in the MBSFN area. The MBSFN controlling unit 2e operates as the resource sharing unit 2a and the receiving quality judging unit 2b illustrated in FIG. 1. The MBSFN controlling unit 2e includes a memory 2f storing a threshold for judgment.

Figure 14:
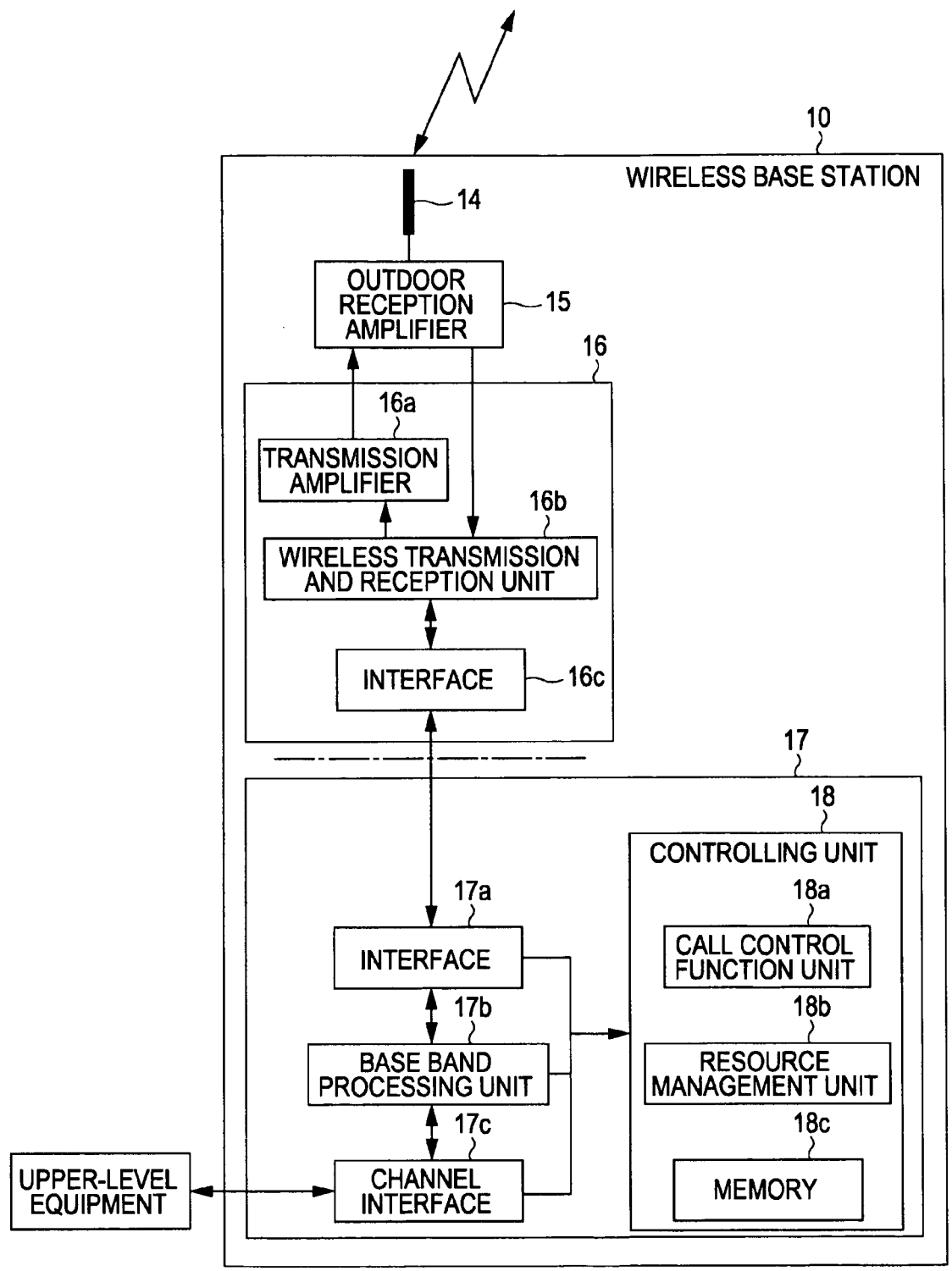
FIG. 14 is a diagram illustrating a structure example of the wireless base station.

FIG. 14 is a diagram describing the structure example of the wireless base station 10. The wireless base station 10 includes an antenna 14, an outdoor reception amplifier 15, a wireless connection unit 16, and a gate way connection unit 17.

The wireless connection unit 16 is a processing unit for performing a connection with a user equipment and includes a transmission amplifier 16a, a wireless transmission and reception unit 16b, and an interface 16c. The gate way connection unit 17 includes an interface 17a, a baseband processing unit 17b, a channel interface 17c, and a controlling unit 18.

The controlling unit 18 includes a call control function unit 18a, a resource management function unit 18b, a memory 18c for storing the parameters and realizes the management and storing of the receiving quality report data from the user equipment, and the report controlling processing to the MBSFN controlling unit.

Figure 15:
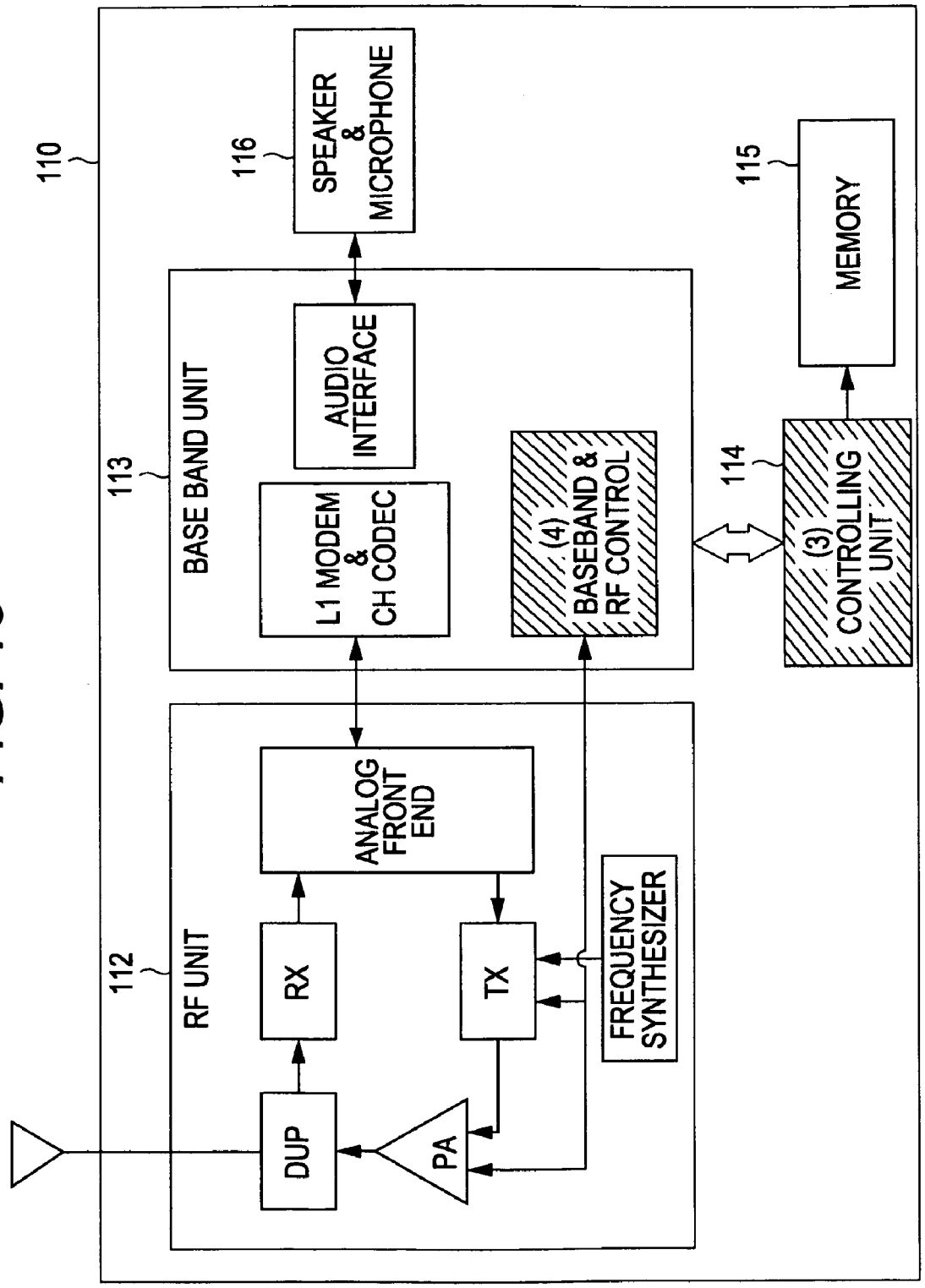
FIG. 15 is a diagram illustrating a structure example of the user equipment.

FIG. 15 is a diagram describing the structure example of the user equipment 110. The user equipment 110 includes an RF unit 112, a baseband unit 113, a controlling unit 114, a memory unit 115, and a speaker and microphone 116.

The RF unit 112 includes a DUP (duplexer: distributor), a PA (power amp: signal amplifier), a TX (transmitter), an RX (receiver), a frequency synthesizer, and an analog front end. The baseband unit 113 includes an L1 modem CH codec, an audio interface, and a base band & RF control.

The controlling unit 114 carries out wireless channel management, quality management, and mobility management. The base band & RF control measures the receiving quality of the MBMS service. The controlling unit 114 also stores the measurement data in the memory 115, manages the data and reports the data to the wireless base station.

As described above, in the wireless communication system according to an embodiment, the user equipment (UE) reports the receiving quality for every MBMS service being received among the MBMS services in the MBSFN area. By performing the resetting control of the wireless resources according to the receiving quality in the wireless base station (eNodeB) and the multi-cell/multicast coordination entity (MCE), the receiving quality can be improved for every MBMS service.

When a plurality of MBSFN areas are adjacent to each other or overlapped with each other, or a service is supplied to a plurality of MBSFN areas asynchronously, the resource allocation between the MBSFNs can be controlled. In the current mobile communication system, in order to cope with moving environment of the user equipment (UEs), some areas have an area overlapping rate of beyond 50% at the area boundary thereof. However, when an MBMS service is applied to the same area structure, it is possible to assure the quality in all the user equipment existing in the corresponding area.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A wireless communication system comprising:
   a multi service supplying unit which transmits same data to a plurality of user equipment;
   a quality evaluation result collecting unit which both communicates with a wireless base station which carries out a multi service of transmitting the same data to the plurality of user equipment and collects quality evaluation results of the multi service from the plurality of user equipment; and
   a resource controlling unit which controls shared wireless communication resources used for the multi service according to the quality evaluation results by determining a share of wireless communication resources for use in the multi service according to the quality evaluation results and informing the wireless base station of the share, and wherein the resource controlling unit changes said share by changing a frequency band for use in the multi service from one frequency band to a different frequency band.

2. The wireless communication system according to claim 1, further comprising:
   a judging unit which calculates an average value of receiving quality levels from the quality evaluation results collected by the quality evaluation result collecting unit and judges whether or not a share of the wireless communication resources is changed based on comparison between the average value and a threshold.

3. The wireless communication system according to claim 1, wherein said wireless base station comprising:
   a multi service supplying unit which transmits the same data to the plurality of user equipment;
   a receiving quality evaluation accepting unit which receives the quality evaluation results of the multi service from the plurality of user equipment;
   a receiving quality evaluation report controlling unit which outputs a received receiving quality evaluation to a management equipment which manages the multi service; and
   a multi service executing unit which sets wireless communication resources used for the multi service according to a control from the management equipment and executes the multi service based on setting wireless communication resources.

4. The wireless base station according to claim 3, wherein the quality evaluation report controlling unit collectively outputs a plurality of the quality evaluation results obtained from the plurality of user equipment to the management equipment.

5. The wireless communication system according to claim 1, wherein each user equipment comprises:
   a multi service receiving unit which receives said same data transmitted to the plurality of user equipment;
   an evaluating unit which evaluates receiving quality of the multi service; and
   a quality evaluation result reporting unit which outputs the evaluation result to said wireless base station.

6. The wireless communication system according to claim 1, further comprising:
   a judging unit which calculates an average value of receiving quality levels from the quality evaluation results collected by the quality evaluation result collecting unit and judges whether or not the share of wireless communication resources is changed based on comparison between the average value and a threshold.

* * * * *